United States Patent
Doty

(10) Patent No.: US 9,342,524 B1
(45) Date of Patent: May 17, 2016

(54) METHOD AND APPARATUS FOR SINGLE INSTANCE INDEXING OF BACKUPS

(75) Inventor: Keith Doty, St. Paul, MN (US)

(73) Assignee: Veritas Technologies LLC, Mountain View, CA (US)

( * ) Notice: Subject to any disclaimer, the term of this patent is extended or adjusted under 35 U.S.C. 154(b) by 435 days.

(21) Appl. No.: 11/704,755

(22) Filed: Feb. 9, 2007

(51) Int. Cl.
G06F 17/30 (2006.01)

(52) U.S. Cl.
CPC .............................. *G06F 17/30097* (2013.01)

(58) Field of Classification Search
CPC ..................... G06F 17/3015; G06F 17/30097
USPC .................. 707/103 Y, 201, 204, 650; 714/6; 711/118, 162
See application file for complete search history.

(56) References Cited

U.S. PATENT DOCUMENTS

| | | | | |
|---|---|---|---|---|
| 6,163,859 A * | 12/2000 | Lee | .......................... | G06F 21/00 709/212 |
| 7,472,242 B1 * | 12/2008 | Deshmukh | .......... | G06F 11/1451 711/162 |
| 7,673,099 B1 * | 3/2010 | Beaverson | .......... | G06F 12/0866 711/118 |
| 2002/0091710 A1 * | 7/2002 | Dunham | ............. | G06F 11/1464 707/2 |
| 2007/0276823 A1 * | 11/2007 | Borden | ............. | G06F 17/30097 707/5 |
| 2008/0243914 A1 * | 10/2008 | Prahlad | ............... | G06F 11/1453 707/3 |

* cited by examiner

*Primary Examiner* — Cam-Linh Nguyen
*Assistant Examiner* — Chelcie Daye
(74) *Attorney, Agent, or Firm* — Campbell Stephenson LLP

(57) ABSTRACT

A method and apparatus for single instance indexing of backup images is provided. In one example, a content identifier is established for a file in the backup images. An index database associated with the backup images is queried with the content identifier. Content and metadata of the file is indexed if the content identifier is not in the index database. Only the metadata for the file is indexed if the content identifier is not in the index database. In one example, the content identifier comprises a file identifier defined by the metadata for the file. In another example, the content identifier comprises a checksum computed for the file.

18 Claims, 4 Drawing Sheets

METHOD AND APPARATUS FOR SINGLE INSTANCE INDEXING OF BACKUPS

BACKGROUND OF THE INVENTION

1. Field of the Invention

The present invention generally relates to computers and, more particularly, to methods and apparatus for indexing files within backup images.

2. Description of the Background Art

Enterprise data indexing for subsequent fast searching for compliance and discovery purposes has become important. A primary, fairly accessible source of enterprise data is a backup image. However, due to varying policies within corporations, the same data that is backed up can likely exist in multiple backups. Indexing the same file multiple times is very costly in machine and network resources as well as the actual time for the indexing process.

Single Instance Storage (SIS), where only one copy of any given file is backed up or archived at any given time is one option available to improve resource use within an organization. However, archiving and/or backing up only a single copy of a given file does not always fit the needs of every user or enterprise. Some users require that their entire enterprise data set be regularly backed up on a backup image so that the user can recreate the exact configuration of their enterprise data as it existed just prior to the execution of any given backup. There is a need, therefore, to address the above-mentioned problems.

SUMMARY OF THE INVENTION

A method and apparatus for single instance indexing of backup images is provided. In one embodiment, a content identifier is established for a file in the backup images. An index database associated with the backup images is queried with the content identifier. Content and metadata of the file is indexed if the content identifier is not in the index database. Only the metadata for the file is indexed if the content identifier is not in the index database. In one embodiment, the content identifier comprises a file identifier defined by the metadata for the file. In another embodiment, the content identifier comprises a checksum computed for the file.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
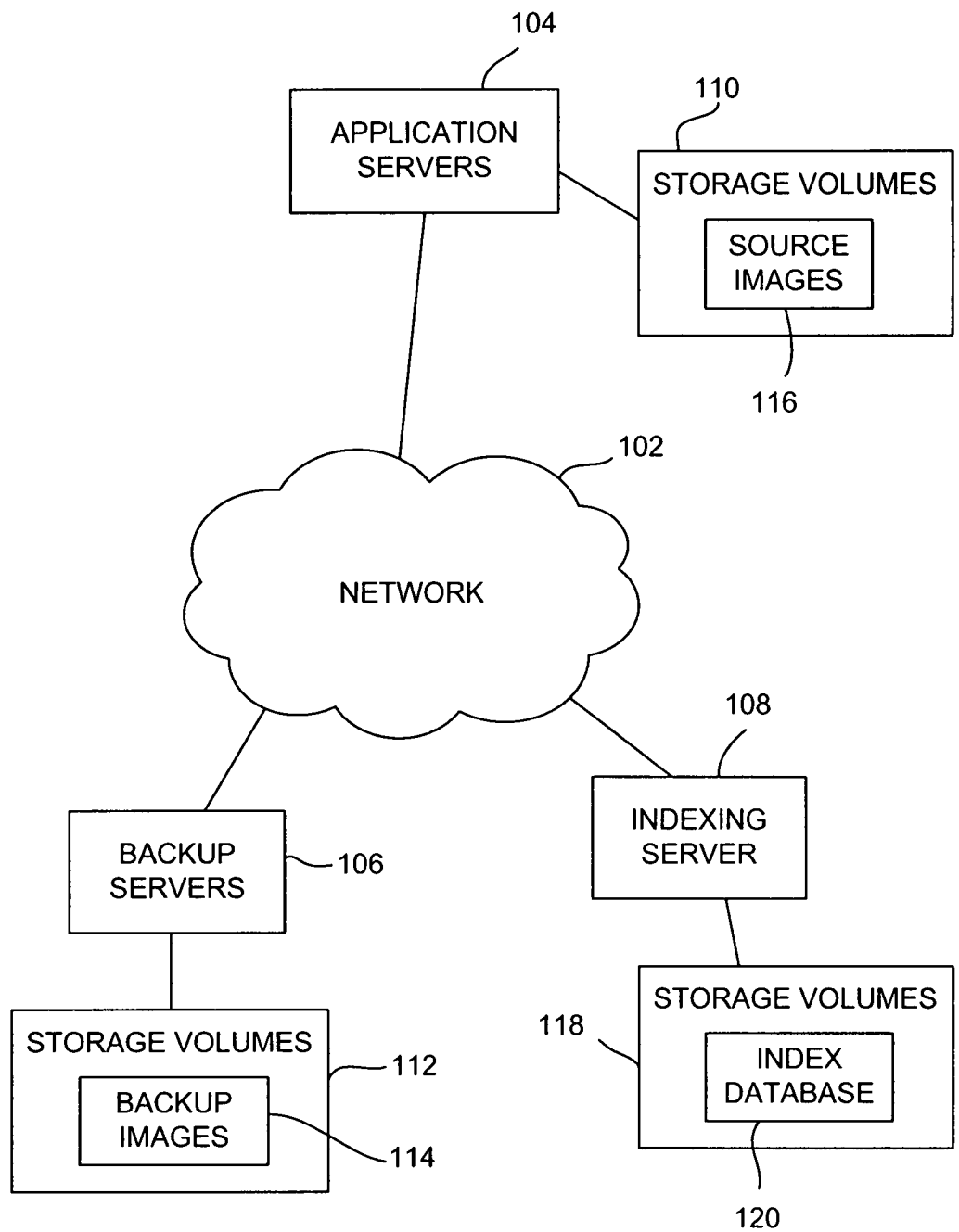
FIG. 1 is a block diagram depicting an exemplary embodiment of a computer network in accordance with one or more aspects of the invention.

FIG. 1 is a block diagram depicting an exemplary embodiment of a computer network 100 in accordance with one or more aspects of the invention. The computer network 100 includes a network 102, application servers 104, backup servers 106, and an indexing server 108. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information.

The application servers 104 may include file servers, e-mail servers, terminal servers, and/or the like. The application servers 104 may be implemented using any type of computer systems. The application servers 104 are configured to manage one or more storage volumes 110. The storage volumes 110 may comprise any type of block-based storage areas and may be implemented using any type of storage system or storage systems, such as a disk drive system. A disk drive system may include, for example, one or more storage disks, e.g., an array of storage disks or redundant array of storage disks. The storage volumes 110 store data, such as application programs and program data created and managed by the application servers 104 ("source images 116"). The source images 116 are organized into file systems. A file system refers to the structure and arrangement of files in a storage device. For example, a file system typically includes a hierarchy of directories, each of which may contain one or more files.

The backup servers 106 host backup services for the application servers 104. The backup servers 106 are configured to manage one or more storage volumes 112. The storage volumes 112 may be implemented using the same storage system that implements the storage volumes 110, or using a separate storage system (e.g., a separate disk drive system). The storage volumes 112 store backup images 114 that comprise backups of the source images 116. The backup images 114 may include full backups (i.e., a full copy of a source image) and incremental backups (i.e., a backup of file changes with respect to a full backup). The backup servers 106 are also coupled to an archive storage system 112, such as a tape drive system. The backup servers 106 may migrate one or more of the backup images 114 to the archive storage system 112. The backup servers 106 may be implemented using any type of computer systems capable of hosting backup services.

The indexing server 108 hosts an indexing service for the backup servers 106. The indexing server 108 is configured to manage one or more storage volumes 118. The storage volumes 118 may be implemented using the same storage system that implements the storage volumes 110 and/or storage volumes 112, or using a separate storage system (e.g., a separate disk drive system). The storage volumes 118 store an index database 120 that stores an index of data in the backup images 114. In accordance with one or more aspects of the invention, the indexing server 108 implements a single-instance indexing process, as described below.

Figure 2:
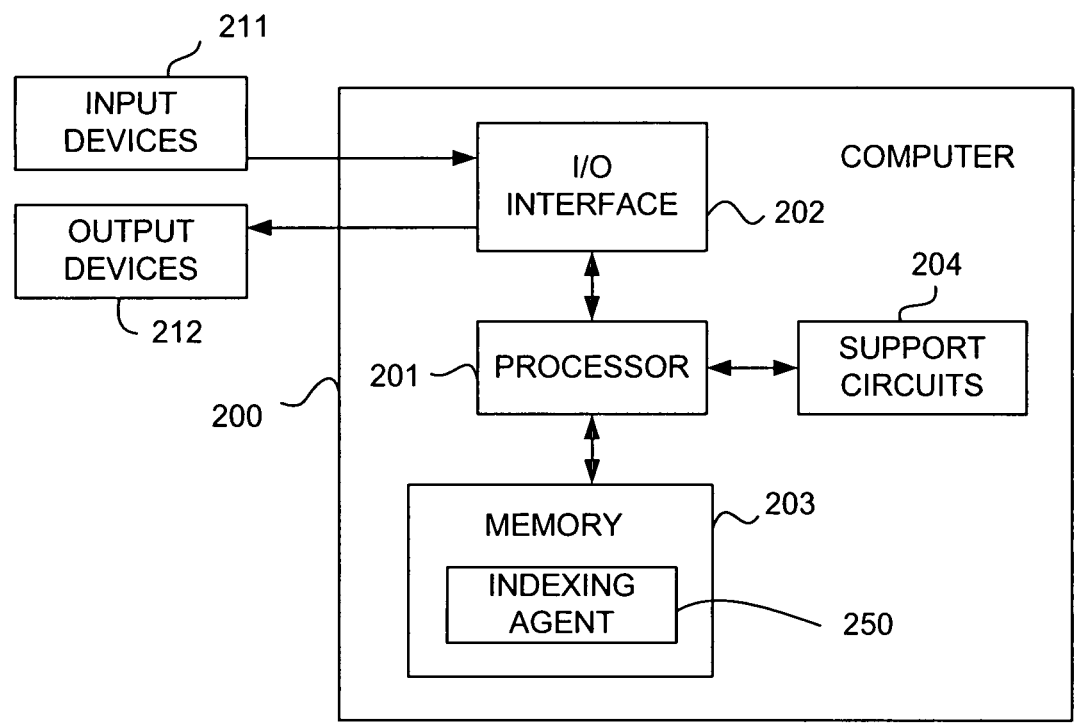
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement the indexing server 108 in FIG. 1. The computer system 200 includes a processor 201, a memory 203, various support circuits 204, and an I/O interface 202. The processor 201 may include one or more microprocessors known in the art. The support circuits 204 for the processor 201 include conventional cache, power supplies, clock circuits, data registers, I/O interfaces, and the like. The I/O interface 202 may be directly coupled to the memory 203 or coupled through the processor 201. The I/O interface 202 may also be configured for communication with a network, with various storage devices, as well as other types of input 211 and output devices 212 (e.g., mouse, keyboard, display, etc).

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 may include an indexing agent 250. The indexing agent 250 is configured to execute a single-instance indexing process, as described below. The computer system 200 may be programmed with an operating system 550, which may be OS/2, Java Virtual Machine, Linux, Solaris, Unix, Windows, Windows95, Windows98, Windows NT, and Windows2000, WindowsME, and WindowsXP, Windows Server, among other known platforms. At least a portion of an operating system may be disposed in the memory 203. The memory 203 may include one or more of the following random access memory, read only memory, magneto-resistive read/write memory, optical read/write memory, cache memory, magnetic read/write memory, and the like.

Figure 3:
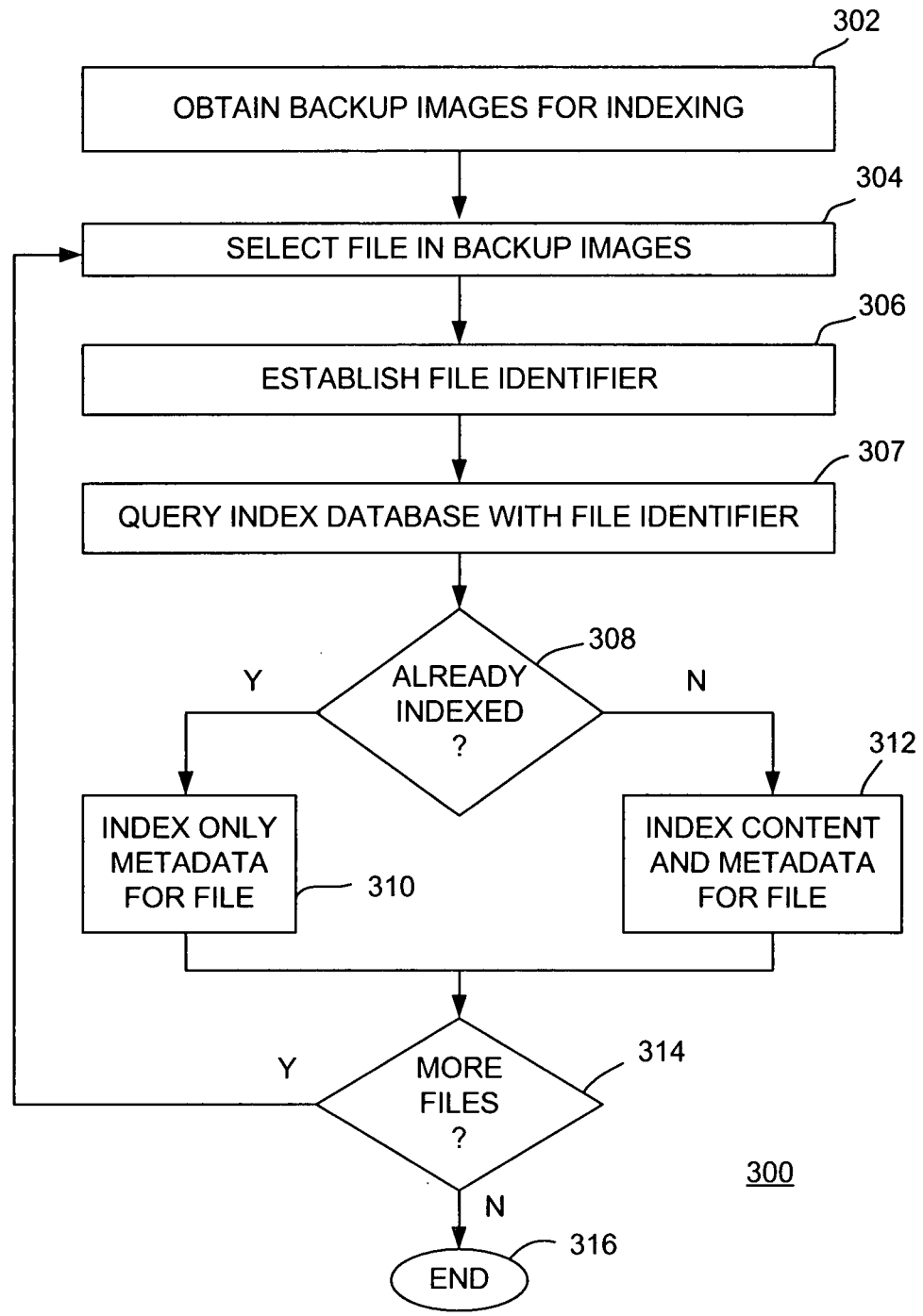
FIG. 3 is a flow diagram depicting an exemplary embodiment of a method for indexing data in backup images in accordance with one or more aspects of the invention.

FIG. 3 is a flow diagram depicting an exemplary embodiment of a method 300 for indexing data in backup images in accordance with one or more aspects of the invention. The method 300 may be performed by the indexing agent 250 of FIG. 2 and the indexing server 108 of FIG. 1. The method 300 begins at step 302, where backup images are obtained for indexing. At step 304, a file in the backup images is selected.

At step 306, an identifier for the file is established. In some embodiments, the file identifier is established using metadata for the file. The term "metadata" as used herein means any type of data that describes a file. File metadata may include various attributes, include one or more of file path, file size, file modify date, file create date, and the like. Such attributes in the metadata for a file may be used to establish the file identifier.

In some embodiments, the file identifier is established using file metadata and catalog data for the backup image. The catalog data includes various attributes associated with the files in the backup image, including the host machines on which the files resided. The catalog data also includes the type of backup image, i.e., full backup or incremental. Attributes in the backup catalog may be combined with attributes in the file metadata to establish the file identifier. In one specific non-limiting embodiment, the file identifier is established by combining the file path, file size, and file modify date from the file metadata, with the host machine on which the file resided and the type of backup image from the backup catalog data. In some embodiments, the file path in the file metadata is expressed in accordance with the Universal Naming Convention (UNC). A UNC file path of a file includes the host name. Thus, the file identifier can be established without obtaining the host name information from the backup catalog data, as it is already included in the file metadata.

Including the type of backup image in the file identifier may be used to improve the performance of the method 300. Notably, if the file is from an incremental backup image, it is clear that the file has been modified, since the incremental backup only includes file change information. If the file has been modified, it is desirable to index the file in order to capture possibly new content in the file. On the other hand, if the file is from a full backup image, further processing is needed to determine if the file is a duplicate of another file that has already been indexed.

At step 307, the index database is queried with the file identifier. At step 308, a determination is made whether the file is a duplicate of a file that has already been indexed by the method 300. In some embodiments, a file is not considered to have already been indexed if the file identifier indicates that it is from an incremental backup. If the file identifier indicates that the file is from a full backup, other attributes in the file identifier may be used. For example, the file can be considered a copy of one already indexed if the files contain the same file path, modify date, size, and resided on the same host machine. The file identifier may be used to query the index database 120 to determine if the file is a copy of another file that has already been indexed.

If at step 308 the file is a copy of a file that has already been indexed, the method 300 proceeds to step 310. At step 310, only the metadata for the file is indexed. Indexing the metadata of the file allows the file and all copies of the file to be included in a search result. Indexing the file metadata may be significantly faster than indexing the content of the file. It also saves space in the index database 120, avoiding duplicative index information for the same content. If at step 308 the file is not a copy of a file that has already been indexed, the method 300 proceeds to step 312. At step 312, the file is indexed, including the metadata and the content thereof. From steps 310 and 312, the method 300 proceeds to step 314. At step 314, a determination is made whether there are more files to process. If so, the method 300 returns to step 304 and repeats. Otherwise, the method 300 ends at step 316.

Figure 4:
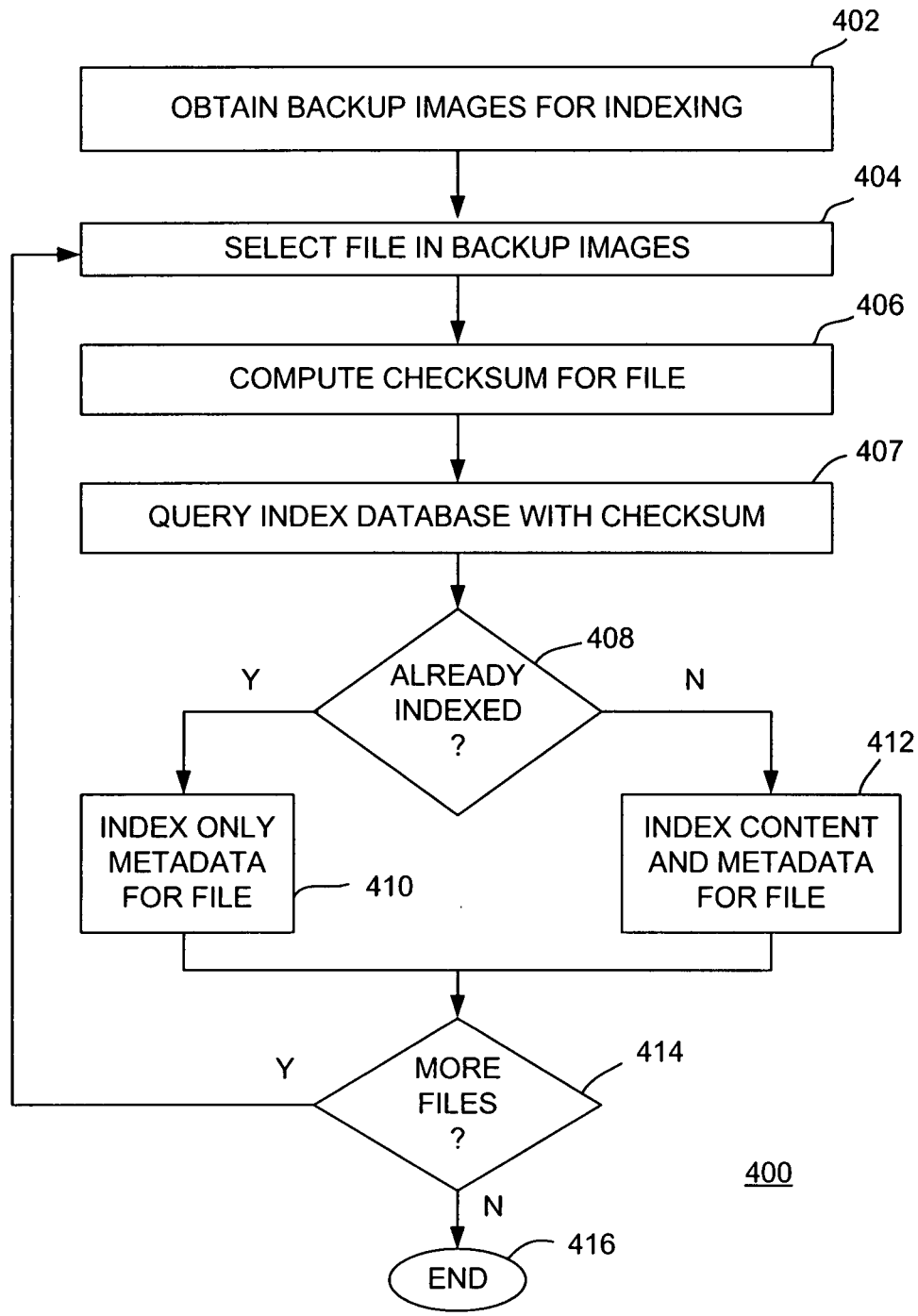
FIG. 4 is a flow diagram depicting another exemplary embodiment of a method for indexing data in backup images in accordance with one or more aspects of the invention.

FIG. 4 is a flow diagram depicting another exemplary embodiment of a method 400 for indexing data in backup images in accordance with one or more aspects of the invention. The method 400 may be performed by the indexing agent 250 of FIG. 2 and the indexing server 108 of FIG. 1. The method 400 begins at step 402, where backup images are obtained for indexing. At step 404, a file in the backup images is selected. At step 406, a checksum is computed for the file. Any well-known checksum algorithm may be used to compute the checksum for the file, such as cyclic redundancy check (CRC) algorithms. The checksum identifies the file based on its content.

At step 407, the index database is queried with the checksum. At step 408, a determination is made whether the file is a duplicate of a file that has already been indexed by the method 400. In some embodiments, a file is not considered to have already been indexed if its checksum does not match the checksum of any file that has already been indexed. If, however, the checksum of the file does match the checksum of another file that has already been indexed, the file is designated as a duplicate. As described below, the checksums of files stored in the index database 120 may be included in their metadata.

If at step 408 the file is a copy of a file that has already been indexed, the method 400 proceeds to step 410. At step 410, only the metadata for the file is indexed. Indexing the metadata of the file allows the file and all copies of the file to be included in a search result. Indexing the file metadata may be significantly faster than indexing the content of the file. It also saves space in the index database 120, avoiding duplicative index information for the same content. If at step 408 the file is not a copy of a file that has already been indexed, the method 400 proceeds to step 412. At step 412, the file is indexed, including the metadata and the content thereof. The checksum computed at step 406 is also included in the file metadata. From steps 410 and 412, the method 400 proceeds to step 414. At step 414, a determination is made whether there are more files to process. If so, the method 400 returns to step 404 and repeats. Otherwise, the method 400 ends at step 416.

It should be understood that using methods, techniques, and computer programs known in the art, a calculated checksum can be a quasi-unique checksum value. Accordingly, it is possible for two files having different contents to have the same checksum value. In other words, a false positive result can arise from comparing the file checksums of two files and only using this comparison to determine if the files are the same. In some embodiments, to protect against a false positive result, a comparison between the file sizes of the two files having the same checksum can be performed at step 408. If the file sizes are equal, then it can be assumed that the file is a duplicate of a file that has already been indexed (i.e., a false positive did not occur). If, however, the file sizes differ, then it can be assumed a false positive has occurred. In this event, it is assumed that the file is not a duplicate of a file that has already been indexed, despite its checksum matching the checksum of another file.

Method and apparatus for single instance indexing of backup images has been described. In some embodiments, when a file in the backup images is selected for indexing, a file identifier is established. The file identifier may be defined by metadata for the file. Alternatively, the file identifier may be defined by both metadata for the file and data from a backup catalog for the backup images. In other embodiments, when a file in the backup images is selected for indexing, a checksum is computed for the file. In general, when a file in the backup images is selected for indexing, a content identifier is established. The term "content identifier" is meant to encompass a file identifier or a checksum. The content identifier is specifically associated with the selected file. The content identifier is used to query an index database to determine if a duplicate of the file has already been indexed. If the content identifier is not in the index database, then a duplicate of the file has not already been indexed and the content and metadata for the file is indexed. If the content identifier is in the index database, then a duplicate of the file has already been indexed and only the metadata for the file is indexed.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While, for the purposes of disclosure there have been shown and described what are considered at present to be illustrative, example embodiments of the present invention; it will be appreciated by those skilled in the art that other uses can be resorted to and changes can be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention can be devised without departing from the basic scope thereof, and the scope thereof is determined by the claims that follow.

The invention claimed is:

1. A method of indexing backup images in a computer network, comprising:
    creating the backup images in memory;
    establishing a first file identifier for a first file in a first of the backup images, wherein
        the first file identifier is established by combining attributes in file metadata and attributes in catalog data, and
        the file metadata and the catalog data are maintained separately;
    computing a checksum for the first file;
    determining a backup type of the first backup image is set to full backup;
    in response to determining the backup type of the first backup image is set to full backup, querying a search index associated with the backup images with the first file identifier and with the checksum;
    determining whether the first file is duplicative of a file that has previously been indexed by the search index by calculating if there is a match of the first file identifier or the checksum in the search index based on the querying, wherein
        in response to not finding a match of the first file identifier or the checksum in the search index,
            determining that the first file is not duplicative of the file,
            including the checksum for the first file in the file metadata, and
            updating the search index by adding the file metadata for the first file and content of the first file, and
        in response to finding a match of the first file identifier or the checksum in the search index, comparing file sizes of the first file and file,
determining that the first file is duplicative of the file if the file sizes of the first file and the file are equal and if the match is of the checksum, and
updating the search index by adding the file metadata for the first file, but not content of the first file; and
maintaining the first file in memory after updating the search index.

2. The method of claim 1, wherein
the backup type of the first backup image is obtained from the catalog data.

3. The method of claim 1, wherein
the querying comprises comparing the first file identifier with a plurality of file identifiers for files indexed in the search index.

4. One or more computer readable memories comprising instructions, wherein a method is implemented in response to executing the instructions, the method comprising:
creating a plurality of backup images in memory;
establishing a first file identifier for a first file in a first of the plurality of backup images, wherein
the first file identifier is established by combining attributes in file metadata and attributes in catalog data, and
the file metadata and the catalog data are maintained separately;
computing a checksum for the first file;
determining a backup type of the first backup image is set to full backup;
in response to determining the backup type of the first backup image is set to full backup, querying a search index associated with the backup images with the first file identifier and with the checksum;
determining whether the first file is duplicative of a file that has previously been indexed by the search index by calculating if there is a match of the first file identifier or the checksum in the search index based on the querying, wherein
in response to not finding a match of the first file identifier or the checksum in the search index,
determining that the first file is not duplicative of the file,
including the checksum for the first file in the file metadata, and
updating the search index by adding the file metadata for the first file and content of the first file, and
in response to finding a match of the first file identifier or the checksum in the search index,
comparing file sizes of the first file and file,
determining that the first file is duplicative of the file if the file sizes of the first file and the file are equal and if the match is of the checksum, and
updating the search index by adding the file metadata for the first file, but not content of the first file; and
maintaining the first file in memory after updating the search index.

5. The one or more computer readable memories of claim 4, wherein
the backup type of the first backup image is obtained from the catalog data.

6. A system, comprising:
at least one backup server configured to maintain a plurality of backup images in memory; and an indexing server for managing a search index associated with the backup images,
the indexing server configured to:
establish a first file identifier for a first file in a first of the backup images, wherein
the first file identifier is established by combining attributes in file metadata and attributes in catalog data, and
the file metadata and the catalog data are maintained separately;
computing a checksum for the first file;
determining a backup type of the first backup image is set to full backup;
in response to determining the backup type of the first backup image is set to full backup, querying the search index with the first file identifier and with the checksum;
determining whether the first file is duplicative of a file that has previously been indexed by the search index by calculating if there is a match of the first file identifier or the checksum in the search index based on the querying, wherein
in response to not finding a match of the first file identifier or the checksum in the search index,
determining that the first file is not duplicative of the file,
including the checksum for the first file in the file metadata, and
updating the search index by adding the file metadata for the first file and content of the first file, and
in response to finding a match of the first file identifier in the search index
comparing file sizes of the first file and file,
determining that the first file is duplicative of the file if the file sizes of the first file and the file are equal and if the match is of the checksum, and
updating the search index by adding the file metadata for the first file, but not content of the first file; and
maintaining the first file in memory after updating the search index.

7. The system of claim 6, wherein
the backup type of the first backup image is obtained from the catalog data.

8. The method of claim 1 further comprising:
establishing a second file identifier and computing a second checksum for a second file in the first of the backup images;
determining the backup type of the first backup image is set to full backup;
in response to determining the backup type of the first backup is set to full backup, querying the search index with the second file identifier and with the second checksum; and
in response to a failure to find a match of the second identifier or the second checksum in the search index, updating the search index by adding the metadata and content of the second file to the search index.

9. The method of claim 8 further comprising:
determining the backup type of the second backup image is set to incremental backup; and
in response to determining the backup type of the second backup is set to incremental backup, updating the search index by adding content and metadata of the second file to the search index.

10. The one or more computer readable memories of claim 4 wherein the method further comprises:
establishing a second file identifier and computing a second checksum for a second file in the first of the backup images;
determining the backup type of the first backup image is set to full backup;

in response to determining the backup type of the first backup is set to full backup, querying the search index with the second file identifier and with the second checksum; and in response to a failure to find a match of the second identifier or the second checksum in the search index, updating the search index by adding content and metadata of the second file to the search index.

11. The one or more computer readable memories of claim 10 wherein the method further comprises:

determining the backup type of the second backup image is set to incremental backup; and in response to determining the backup type of the second backup is set to incremental backup, updating the search index by adding content and metadata of the second file to the search index.

12. The system of claim 6 wherein the indexing server is further configured to:

establish a second file identifier and compute a second checksum for a second file in the first of the backup images;

determine the backup type of the first backup image is set to full backup;

in response to determining the backup type of the first backup is set to full backup, query the search index with the second file identifier and with the second checksum; and in response to a failure to find a match of the second identifier or the second checksum in the search index, update the search index by adding content and metadata of the second file to the search index.

13. The indexing server of claim 12 wherein the indexing server is further configured to:

determine the backup type of the second backup image is set to incremental backup; and in response to determining the backup type of the second backup is set to incremental backup, update the search index by adding content and metadata of the second file to the search index.

14. The method of claim 1, wherein
the attributes in the file metadata comprise at least
a path name of the first file, a size of the first file, or a modify date of the first file.

15. The method of claim 1, wherein
the attributes in the catalog data comprise at least
a first attribute associated with the file metadata of the first file in the first backup image,
a second attribute associated with a host machine on which the first file resided, or
a third attributed associated with the backup type of the first backup image.

16. The method of claim 1, further comprising:
determining whether the first file identifier for the first file in the first of the backup images can be established without obtaining information in the catalog data if the information is already included in the file metadata.

17. The method of claim 16, further comprising:
based on the determining, creating the first file identifier by combining
a host machine information and the backup type of the first backup image from the catalog data, and
a file path, a file size, and a file modify date from the file metadata.

18. The method of claim 1, wherein
the checksum is computed based on content of the first file.

* * * * *